Aug. 31, 1954  R. G. LE TOURNEAU  2,688,104
ROTOR WINDING AND METHOD OF MAKING SAME
Filed June 26, 1950  4 Sheets-Sheet 1

ROBERT G. LE TOURNEAU,
INVENTOR.

BY Lyon & Lyon
ATTORNEYS

ROBERT G. LE TOURNEAU,
INVENTOR.

BY [signature]
ATTORNEYS

Aug. 31, 1954   R. G. LE TOURNEAU   2,688,104
ROTOR WINDING AND METHOD OF MAKING SAME
Filed June 26, 1950   4 Sheets-Sheet 4

ROBERT G. LE TOURNEAU,
INVENTOR.

BY Lyon & Lyon
ATTORNEYS

Patented Aug. 31, 1954

2,688,104

UNITED STATES PATENT OFFICE 2,688,104

ROTOR WINDING AND METHOD OF MAKING SAME

Robert G. Le Tourneau, Longview, Tex., assignor to R. G. Le Tourneau, Inc., Peoria, Ill., a corporation of California Application June 26, 1950, Serial No. 170,272

7 Claims. (Cl. 310—265)

1

This invention relates to a method of forming windings for a specific method of installation on a dynamo-electric machine, such as that shown in my co-pending application entitled "Means for Retaining Windings on a Rotor" Serial No. 162,262, filed May 16, 1950, now Patent No. 2,590,255.

The primary object of this invention is to provide a unique method of installing field windings on a rotor whereby a maximum amount of the iron in the rotor is available for excitation of the field.

Another object is to provide a method of installing a field winding on a rotor having a small number of widely spaced slots wherein the slots are filled with a maximum of conducting material as compared with conventional machines.

A further object is to provide a method of forming the individual coils of the complete winding for the novel method of installation of this invention.

A further object is to provide a method whereby a conventional coil winding machine may be used to form two layer coils of a single wire in which the current flow is the same in each layer and in which the terminals for each layer come out at the same relative location.

Other objects and advantages will be apparent from an examination of the following specification and drawings in which:

Fig. 10 shows in enlarged form a portion of the structure shown in Fig. 5, and shows the

2 manner in which the individual coil sections are serially connected to form a single composite winding.

Figure 11:
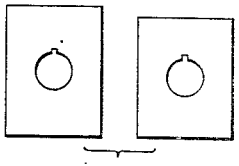

Fig. 11 is a phantom outline showing the various size forms used on the coil winding machine employed for this invention.

Figure 1:
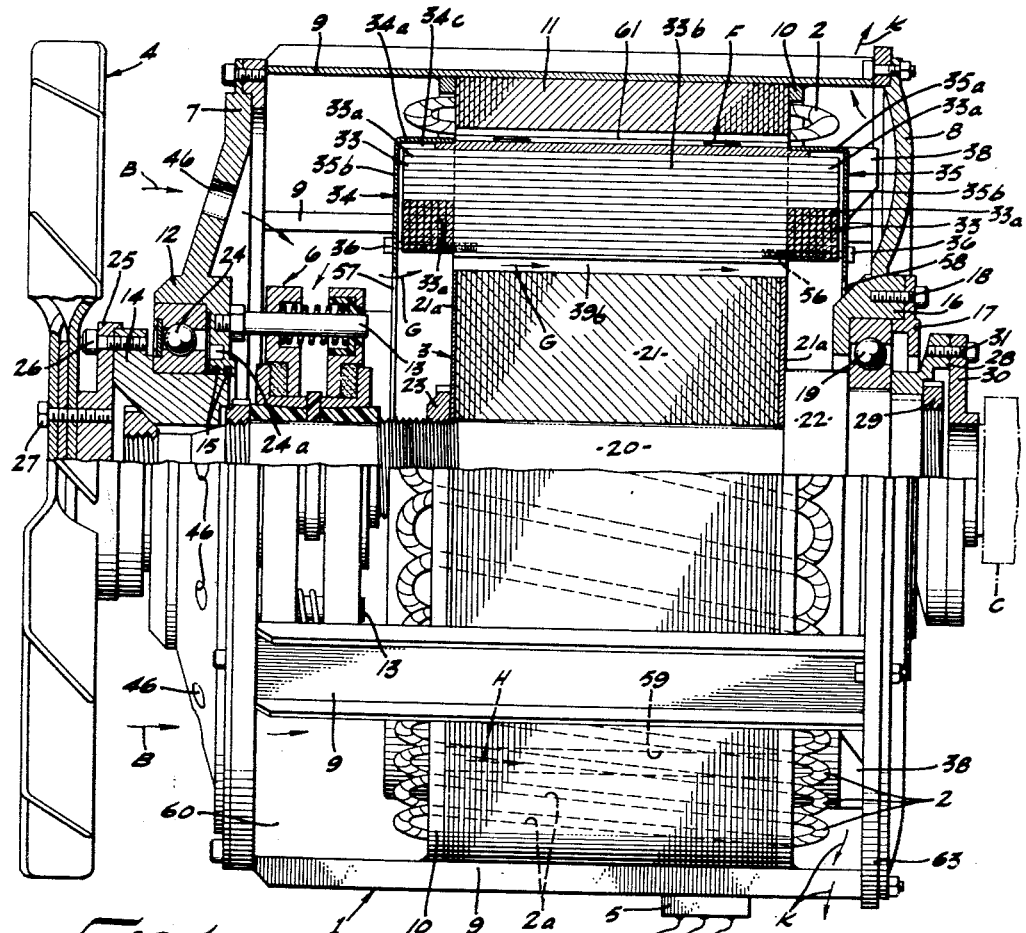
Fig. 1 represents a side elevational view in half section of a complete generator employing the windings of this invention.

Referring now more particularly to the drawings, in Fig. 1 a generator containing a rotor employing the invention at hand is seen to consist basically of a stator frame 1, supporting stator windings 2, a rotor 3 attached at one end to a fan 4 and attached at the other end to an engine crankshaft C, a terminal block 5 from which generated current is taken from the generator, and a slip ring mechanism 6 for supplying exciting current to the rotor.

The slip ring mechanism 6 may be of any desired construction but I prefer to make it in accordance with my co-pending application #117,582, entitled "Slip Ring Arrangement," filed September 24, 1949, now Patent No. 2,623,188.

The stator frame 1 includes front and rear end bells 7 and 8 spaced apart and secured to circumferentially spaced channels 9, which channels by means of annular rings 10 support the stator (or armature) laminations 11, and hold them in place.

These laminations 11 include skewed stator slots 2a to receive stator windings 2. End bell 7 includes a bearing retainer 12 which supports stud 13 of slip ring mechanism 6. Bearing retainer 12 is sealed from rotating adaptor 14 by a pair of conventional piston rings 15 for a purpose later described. The opposite end bell 8 contains a bearing retainer 16 to which plate 17 is secured by capscrews 18 to enclose ball bearing 19.

The rotor 3 as seen in Fig. 1 includes a shaft 20 upon which a stack of rotor (or field) laminations is keyed, the laminations are then pressed between end plates 21a and clamped in place on the shaft between hub 22 and lock nut 23. At the fan end, rotor 3 is spline connected to adapter 14 by a novel arrangement shown in detail in my co-pending application #727,806, filed February 11, 1947. Adapter 14 is in turn rotatably supported by ball bearing 24 and directly connected to fan spacer 25 by capscrews 26. Bearing 24 encloses an oil pocket 24a which is sealed by the previously mentioned piston rings 15. At its end opposite fan 4, the rotor 3 is splined to a drive adapter 28 which is itself locked in place by splined nut 29 and to which bolt plate 30 is attached by capscrews 31. Plate 30 then engages crankshaft C or any other suitable driving means to rotate the generator rotor. The rotor laminations 21 and their end plate 21a both contain winding slots 32 in which windings 33 are inserted. Cylindrical covers 34 and 35 enclose the exposed end legs 33a of windings 33 and are attached to the rotor by capscrews 36 after being centered on wedge extensions 37. Both end covers include circular end members 34b and 35b and cylindrical walls 34a and 35a. One end cover 35 includes blades 38 for circulation of air and heat away from the windings, and to create a low pressure area to assist the blast from fan 4 in creating circulation through the generator as indicated by the arrows F, G, and H. The end members 34b and 35b include central openings 57 and 58 and the end members receive bolts 36 which attach the end covers to rotor 3 by means of tapped holes 56.

The cooling system of this generator may be followed by the arrows shown in Fig. 1. Arrow B represents the direction of the blast of air from fan 4. When this blast reaches end bell 7 it must pass through holes 46 therein to reach area 60 within frame 1. From area 60 the blast B is separated into separate paths as shown by arrows F, G, and H. Path F goes between stator laminations 11 and the circumference 61 of rotor 3. Path G goes through circular opening 57 of end cover 34 and from there through openings 39b formed between depending ribs 39a of vent plate 39 and the bottom 62 of slot 32. Ribs 39a are welded or otherwise secured to a horizontal piece 39c of vent plate 39. Path H goes through opening 57 and into holes 59 of rotor 3. All three paths come together in area 63 adjacent end bell 8 and pass between channels 9 to the outside air as shown by arrows K.

It is observed that the vent plates 39 serve not only to support the windings in their slots but also form a part of the air cooling system. In cooling the machine, it is, of course, desirable to produce an air flow therethrough which is impeded as low as possible and which is not affected appreciably by turbulence in the air stream. For this reason, the end covers 34, 35, besides serving as winding retaining members, present a smooth continuous surface to the air stream induced by the fan 4, thereby eliminating turbulence and windage losses which otherwise might result from the air stream impinging on the exposed coil ends. It is further observed that the end cover 35 has mounted thereon the blade 38 for aiding and inducing an air flow through the machine. Thus, the retaining means provided herein is functionally inter-related and forms a part of the cooling system.

Figure 2:
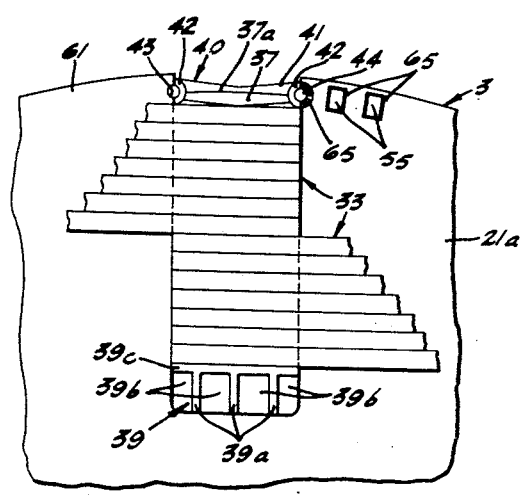
Fig. 2 is a fragmentary end view showing details of the slot winding retainer.
Figure 3:
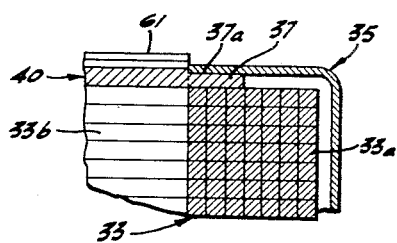
Fig. 3 is a fragmentary side view of a section along lines 3—3 of Fig. 2, showing the extension on the winding retaining wedge.

In Figs. 2 and 3, the novel winding retainer 40 used to hold the longitudinal legs 33b of windings 33 in slots 32 is shown in detail to consist of inwardly bent wedge 41 with semi-circular cups 42 at the lateral edges thereof and longitudinal extensions 37 which project beyond the rotor laminations 21 and end plates 21a at each end. At the top of side walls 53, there is located a semi-circular keyway 43 which aligns with cup 42 to form a full circular opening and to receive a copper rod key 44 which in addition to holding wedge 41 in position, acts as a shading coil for the adjacent poles N and S. Steel bars 55 are equally spaced around the circumference 61 of rotor 3 between copper rods 44 of successive slots 32. Both the copper rods 44 and the steel bars 55 are welded as at 65 to end plates 21a so that they serve as amortisseur windings and shading coils. This construction is similar to that shown in my copending application #99,441, filed June 16, 1949, now abandoned in favor of co-pending application, Serial No. 287,008, filed May 9, 1952, entitled Rotating Electrical Machine.

Figure 4:
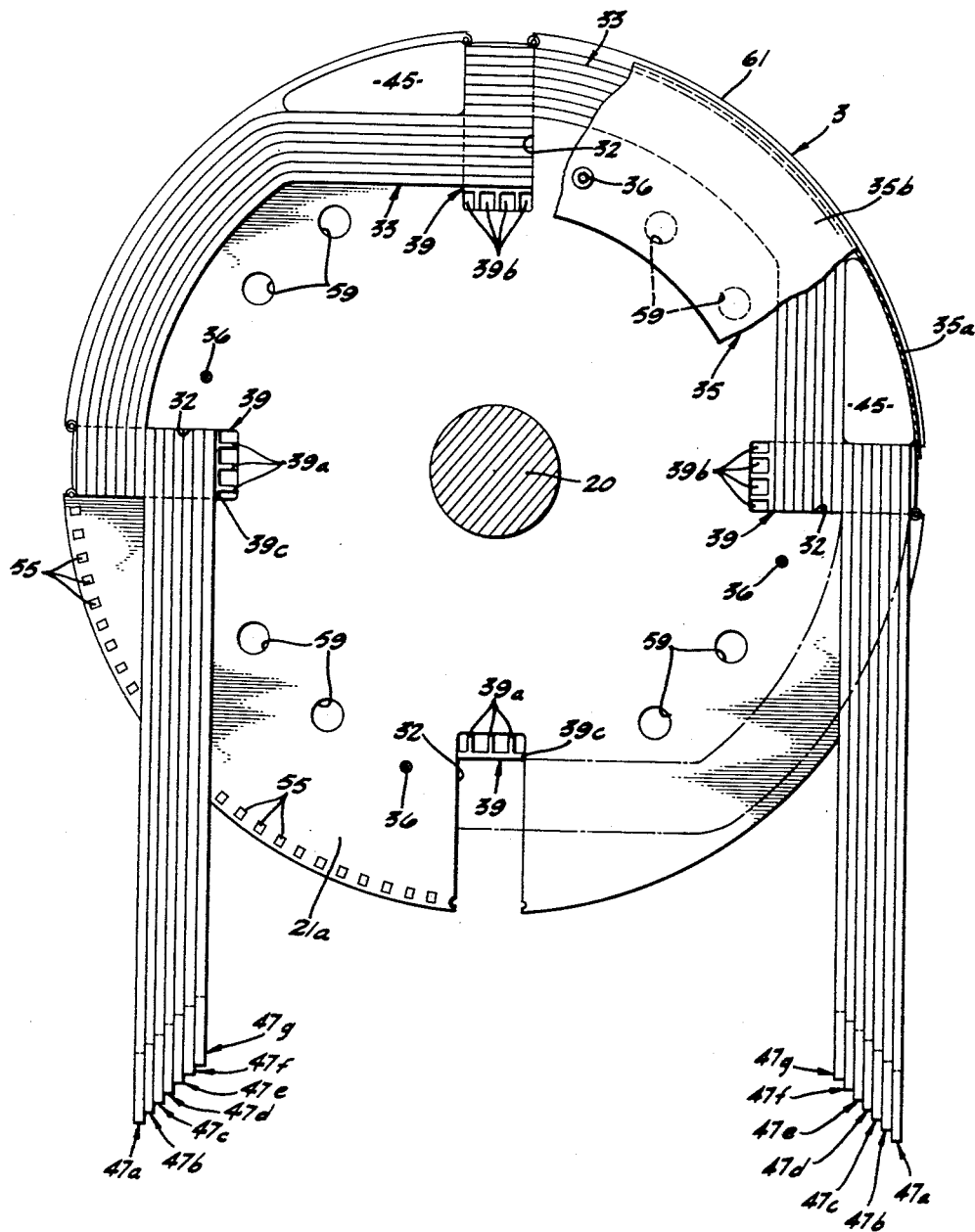
Fig. 4 is an end view of the end of the rotor opposite the brush mechanism showing the windings in the process of being installed.

Extensions 37 of wedges 41 are machined (as at 37a) concentric to but of slightly less diameter than the circumference 61 of rotor 3 for the purpose of holding and centering winding covers 34 and 35, as shown in Figs. 1 and 4. These winding covers closely surround end legs 33a of winding 33 and are wedged where necessary by insulating sheets 45a and fibre pieces 45 to securely hold the legs 33a in position. Sheets 45a are inserted where needed in space 34c between cover 34 and windings 33. From this description it will be seen that the windings 33 will be secure with the rotor against any distortion which would be occasioned by the high speed of the rotor (and the resulting centrifugal force), since both the longitudinal legs 33b are held by wedges 41 and the end legs 33a are tightly held in position by end covers 34 and 35 and pieces 45. The end covers are concentric with the rotor since extensions 37 engage their interior surface at several points. This condition will assist greatly in balancing the rotor after construction.

As previously described, the large fan 4 is located external to frame 1 and blows air therein through holes 46 and part of the circulation goes through vent plate 39 which plate together with wedge 41 secures the windings 33 against radial displacement. It will be observed that by placing the fan 4 external to the frame 1, a much larger diameter fan may be employed than one which is installed inside of frame 1.

Figure 6:
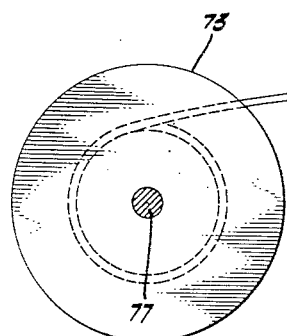
Fig. 6 is an isometric view of one coil section showing the two layers of which it is composed, one layer being shown diagrammatically.

In Fig. 6, a complete coil section 47 will be seen to be composed of two layers 48a and 48b of square wire. In each layer a continuous current will flow in the same clockwise direction, and the terminals 49a and 49b will end adjacent the same point.

Figure 7:
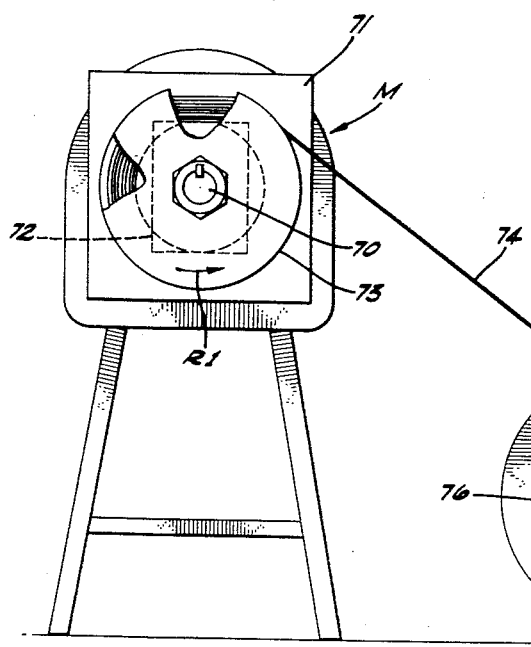
Figs. 7 and 8 are schematic views of two steps in the method of forming the coil section shown in Fig. 6.
Figure 9:
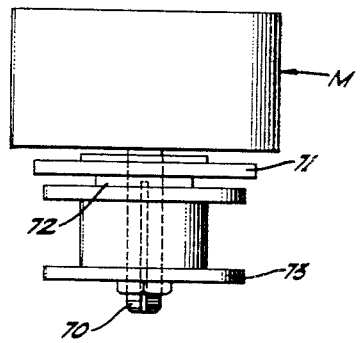
Fig. 9 is a top plan view of the machine M of Figs. 7 and 8.

In Fig. 7 the first step in forming a coil section may be observed. A standard make reversible coil winding machine M includes a motor driven shaft 70 projecting therefrom. A back-up plate 71 is secured on shaft 70, and a generally rectangular shaped form 72 is placed flush against the back-up plate. In preparing the machine for the coil forming operation a small spool 73 is attached to shaft 70 for turning therewith. The first step in the winding process is to wind enough wire 74 from supply spool 75 onto small spool 73 to later form one layer 48b of coil section section 47. Supply spool 75 is turnably mounted on an axle 76 to permit wire 74 to be reeled out in a well known manner. When spool 73 has received the desired amount of wire stock 74a, the wire 74, without severing the connection between spools 73 and 75, is placed over form 72 so that upon further rotation R1 (in the same direction) of the rotating members in unison, i. e., shaft 70, back up-plate 71, form 72, and spool 73, the wire 74 supplied from spool 75 will, beginning at center point 50, build up into a vertical layer 48a. When this layer has been formed to the desired height, the connection between layer 48a and supply spool 75 is cut so as to leave a free end 49a. There has now been formed one layer 48a progressing from a center point 50 to an external free end 49a at the top center of the layer.

Figure 8:
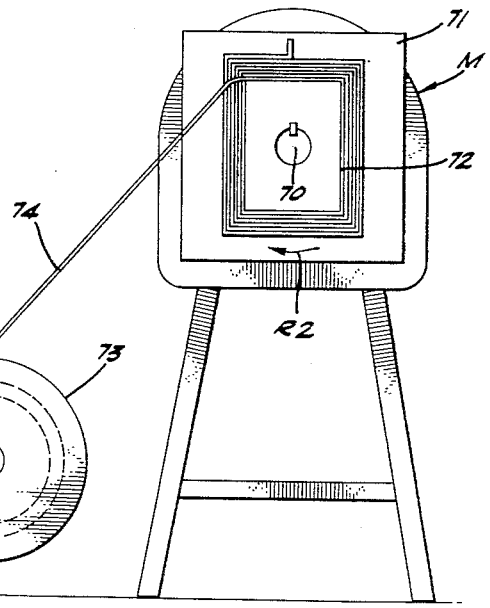

The second stage of this coil forming process may be observed in Fig. 8. With layer 48a still on the form 72, and without severing the connection between point 50 and spool 73, the spool 73 is removed from shaft 70 and placed on a second axle 77 at the opposite side of the machine from spool 75 (which is now inactive). With spool 73 rotatable on axle 77 and with common point 50 of coil layer 48a and wire stock 74 resting on form 72, the rotation of machine M and consequently shaft 70 is reversed (as indicated by the arrow R2), so that a second layer 48b is built up adjacent and parallel to layer 48a. When the second layer 48b has been completed it will either terminate at 49b adjacent free end 49a, or else it will be cut to so terminate. It will be seen from this description and Fig. 6 that this process will produce a coil section consisting of two layers of continuous wire in which a direct current will always travel in the same clockwise direction and in which both layers have their free ends terminating adjacent the same external point. The completed coil section (two layers) 47 may now be removed from the machine and bound together with insulating tape as is customary with dynamo windings.

Figure 10:
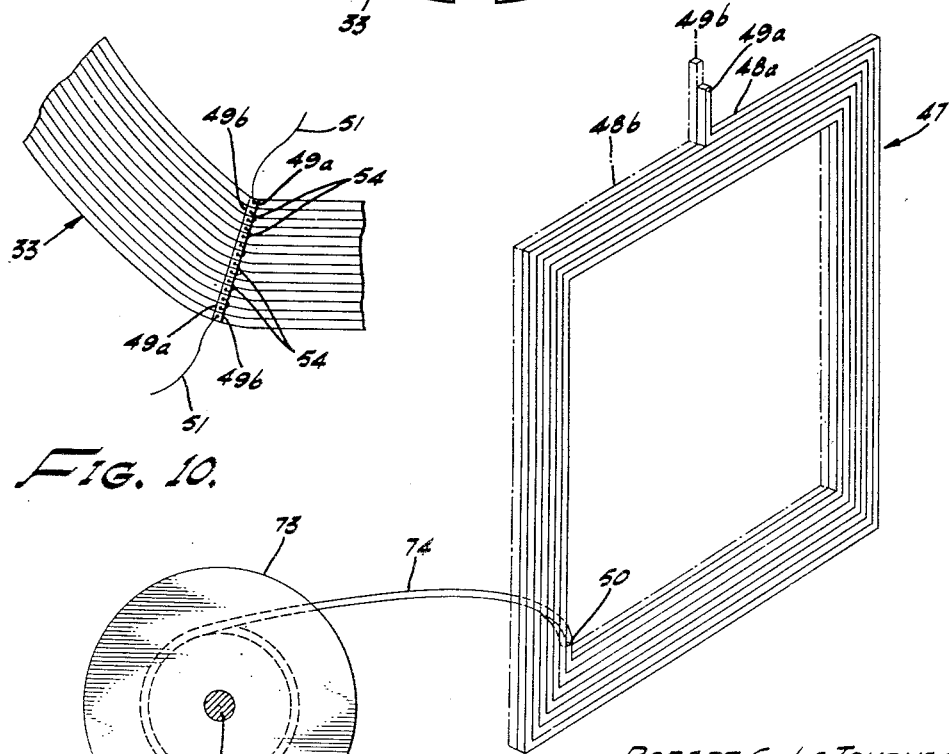

Referring now to the specific method of installing the windings on the rotor, the first step here is to form seven coil sections 47 of different lengths, but of the same width, as shown in Figure 4 as sections 47a–47g, both inclusive, by the method just described, using successively seven slightly different length forms 72, as indicated in Figure 11 by coil forms 72A–72G, both inclusive. The seven staggered lengths of coil sections 47, subsequently serially connected as shown in Figure 10 to form a composite winding 33, are placed at the bottom of one winding slot to overlie the vent plate 39 therein. There are provided four of such composite windings, one for each winding slot. The free legs of these windings 33 comprising the progressively staggered legs 47a–47g, both inclusive, are then bent to follow generally the circumference 61 of the rotor as closely as possible. The free legs are then forced into the next adjacent rotor slot 32, so that when finally in position in overlying relationship to the next winding 33, the originally staggered legs of sections 47a–47g lie on a straight line which extends parallel with the plane of the wall 53 of slot 32. This construction employing square wire coil sections will permit the maximum of copper to be installed in the slot and thereby increase the effectiveness of the magnetic flux created in the poles N and S. The separate windings 33 in the same slot are placed one over the other in a very compact arrangement so that current in all the coil sections 47 in one slot will be travelling in the same direction. This installation has the additional advantage of keeping the end legs 33a of the windings as close as practical to the circumference 61 of the rotor so as to obtain the maximum density of the flux as near the stator as possible.

It should be noted that the number of turns of square wire are such that the resulting winding depth is equal to the rotor slot width, so that the free leg of each section becomes automatically staggered upon inserting the sections into the winding slot.

Figure 5:
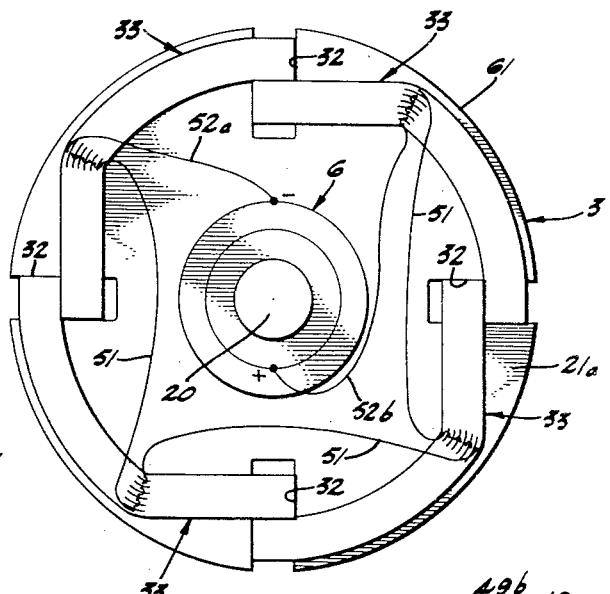
Fig. 5 is an end view of the opposite end of the rotor showing the manner in which the separate windings are connected with each other and to the slip rings.

In Figs. 5 and 10 the method of connecting the individual coil sections of windings 33 may be observed. Each of free ends or terminals 49a and 49b lie closely adjacent and in the same straight line so that they may all be connected in series. In connecting the individual coil sections, short leads 54 are soldered, or otherwise connected between a terminal 49a of one coil section 47 and terminal 49b of the next adjacent coil section 47. The remaining outside leads 51 are then connected serially with the corresponding outside terminal of the adjacent composite winding 33. When all four windings 33 have thus been connected serially, leads 52a and 52b are connected to slip ring mechanism 6 so that they are of opposite polarity and direct current introduced through the slip ring mechanism will make a complete circuit through the four windings.

It will be observed from the above description that the method of forming the individual coil sections is closely related to the method of installing the completed windings on the rotor since many of the advantages of the installation are dependent upon the specific method of forming the coil sections, such as: the use of square wire to permit the maximum of copper to be present in the slots; the coil sections being formed in staggered lengths so as to completely fill the slots; the forming of coil sections having end terminals 49a and 49b adjacent the same point and being formed of a continuous length of wire which travels in the same clockwise direction; and the coil sections being generally rectangular in outline so as to lie close to the end plates 21a of the rotor lamination.

From the foregoing description it will be readily seen that I have produced such a device as substantially fulfills the objects of the invention as set forth herein.

While this specification sets forth in detail the present and preferred construction of this invention, still in practice such deviations from such detail may be resorted to as do not form a departure from the spirit of the invention, as defined in the appended claims.

Having thus described my invention, what I claim as new and useful and desire to secure by Letters Patent is:

1. In the method of winding a rotor having spaced winding slots open to the circumference, the steps comprising: fabricating a winding having a plurality of staggered lengths of planar coil sections, with each coil section having a pair of legs and with one of said pair of legs of each coil section being superimposed on a corresponding leg of an adjacent coil section to form superimposed legs, and with the other one of the pair of legs of each coil section being laterally displaced with respect to a corresponding leg of an adjacent coil section to form staggered legs, placing the superimposed legs in one of said slots with said staggered legs constituting a free end of said winding, and then bending said free end with said superimposed legs engaging the walls in said one slot and forming a fulcrum to allow the coil section to follow the circumference of the rotor to place all of said staggered legs in a second common slot in superimposed relationship.

2. A winding for a rotor having spaced winding slots open to the circumference, said winding having a plurality of staggered lengths of planar coil sections, with each coil section having a pair of legs and with one of said pair of legs of each coil section being superimposed on a corresponding leg of an adjacent coil section to form superimposed legs, and with the other one of the pair of legs of each coil section being laterally displaced predetermined distances with respect to a corresponding leg of an adjacent coil section to form staggered legs, so that the superimposed legs may be placed in one of said slots with said staggered legs constituting a free end of said winding, whereby said free end may be bent to allow the coil section to follow the circumference of the rotor to place all of said staggered legs in a second common slot, said predetermined distances being such that said staggered legs are in superimposed relationship when so placed in said second common slot.

3. A winding as set forth in claim 2 in which said coil sections are formed of wire of square cross section.

4. A winding as set forth in claim 2 in combination with a rotor having spaced slots open to the circumference thereof with said spaced slots having substantially parallel walls and containing the aforementioned pair of legs.

5. A winding as set forth in claim 2 in combination with a rotor having spaced slots open to the circumference thereof with said spaced slots having substantially parallel walls and containing the aforementioned pair of legs, said pair of legs each being formed from wire of square cross section.

6. A winding as set forth in claim 2 having each section thereof comprising two vertical layers from the same continuous wire which traverses the same clockwise direction, with the free ends of said continuous wire terminating at the same relative location.

7. A four-pole generator comprising four equally-sized and equally spaced apart winding slots, a vent plate at the bottom of each slot, composite windings in said slots, each winding occupying two adjacent slots, one longitudinal leg of said winding lying on the vent plate of one slot and the other leg overlapping and lying over the winding of the next adjacent slot, said composite windings being composed of multi-layers of coil sections of equal turns of square wire, the number of turns in each longitudinal leg being sufficient to completely fill the width of the winding slot when said legs are in their installed position, said windings each including an end leg beyond each end of the rotor, said end leg curved to follow a portion of the circumference of the rotor near the periphery thereof, an end cover attached at each end of the rotor in partially surrounding relationship to said windings, said end cover including a cylindrical wall having an outside diameter approximating the diameter of the rotor, the inner diameter of said wall closely surrounding said windings, and fibre wedges inserted between said windings and said cover where required to produce a snug engagement therebetween.

References Cited in the file of this patent

UNITED STATES PATENTS

| Number | Name | Date |
|---|---|---|
| 408,045 | Riker | July 30, 1889 |
| 525,698 | Eickemeyer | Sept. 11, 1894 |
| 618,727 | Priest | Jan. 31, 1899 |
| 685,966 | Blood | Nov. 5, 1901 |
| 768,843 | Burke | Aug. 30, 1904 |
| 931,375 | Behrend | Aug. 17, 1909 |
| 932,097 | Behrend | Aug. 24, 1909 |
| 2,071,977 | Herrick | Feb. 23, 1937 |
| 2,103,795 | Rose | Dec. 28, 1937 |
| 2,261,199 | Wilson | Nov. 4, 1941 |
| 2,261,200 | Wilson | Nov. 4, 1941 |

FOREIGN PATENTS

| Number | Country | Date |
|---|---|---|
| 286,427 | Great Britain | Mar. 8, 1928 |